Dec. 13, 1966  W. R. BAUER  3,292,017
MANUAL CONTROLLER FOR A TIMER
Filed Nov. 30, 1962  3 Sheets-Sheet 1
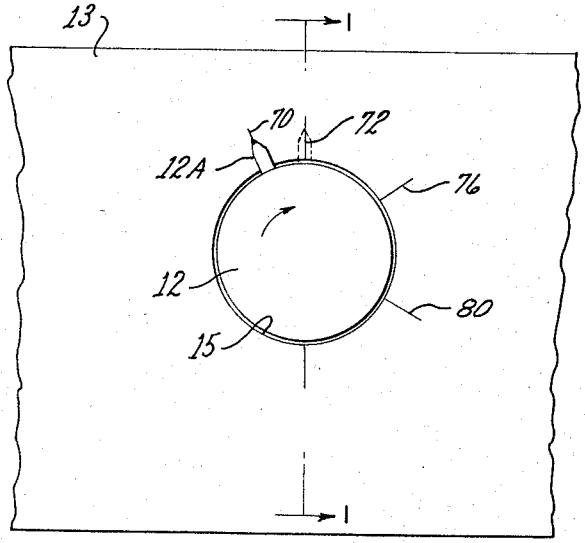
FIG.9
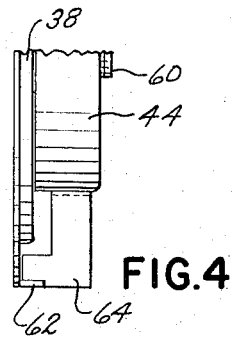
FIG.4
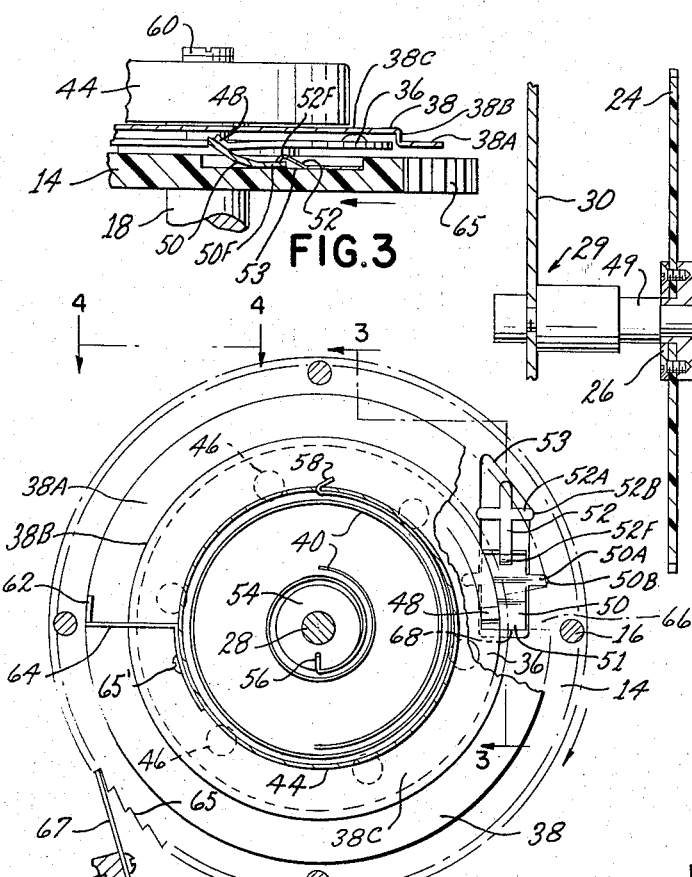
FIG.3
FIG.2
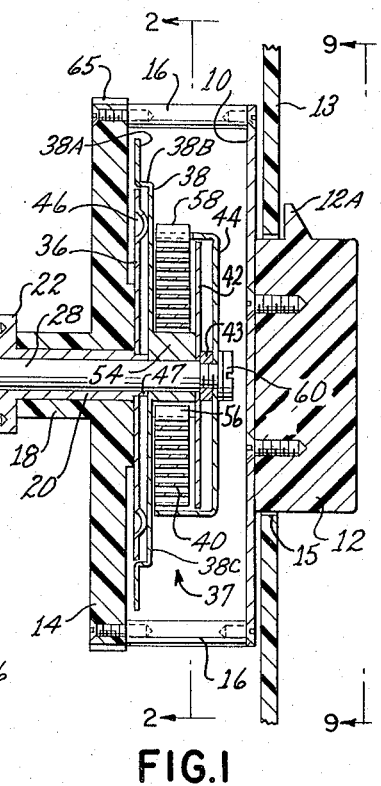
FIG.1
INVENTOR
WERNER ROBERT BAUER
BY
Robert R Candor
HIS ATTORNEY

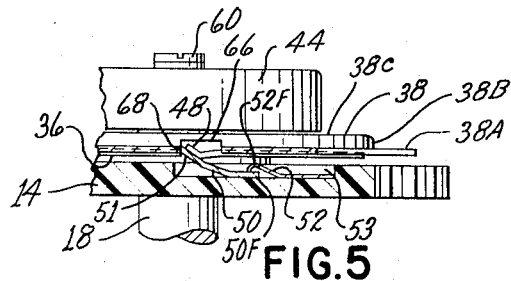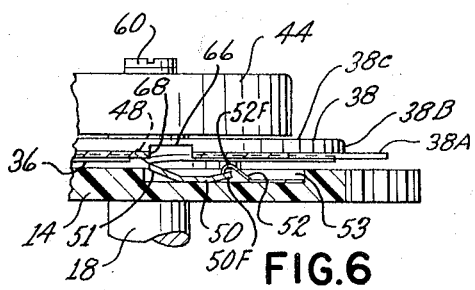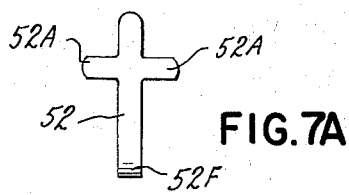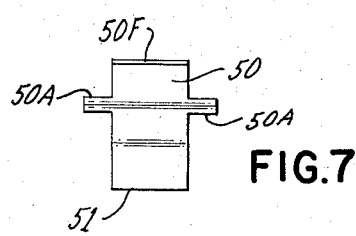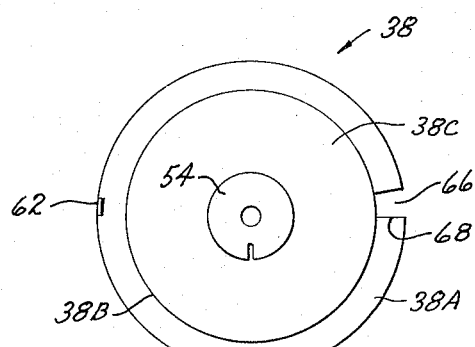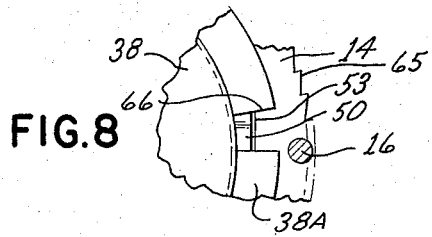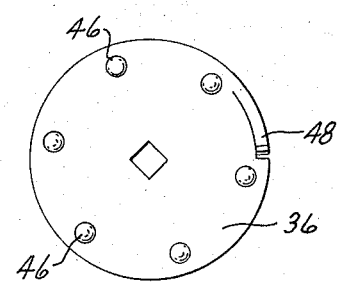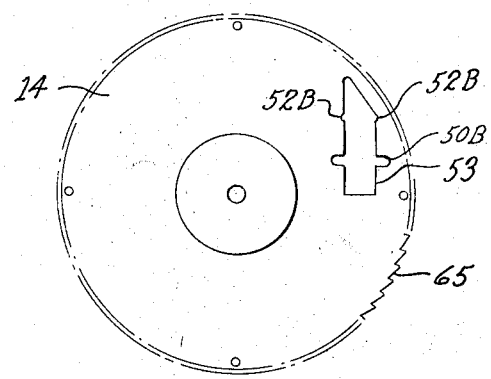

Dec. 13, 1966  W. R. BAUER  3,292,017
MANUAL CONTROLLER FOR A TIMER
Filed Nov. 30, 1962  3 Sheets-Sheet 3

INVENTOR
WERNER ROBERT BAUER

BY Robert R Cauden

HIS ATTORNEY

United States Patent Office 3,292,017
Patented Dec. 13, 1966

3,292,017
MANUAL CONTROLLER FOR A TIMER
Werner Robert Bauer, Columbus, Ohio, assignor to Robertshaw Controls Company, a corporation of Delaware
Filed Nov. 30, 1962, Ser. No. 241,249
14 Claims. (Cl. 307—141.4)

This invention relates to a manual controller, including a knob, handle, or the like, which may be used to actuate or set a rotatable member, such as a timer and the like, from a zero position to a selected position. The construction is such that the knob is automatically released from connection with the rotatable member when a relative motion is produced between the knob and the rotatable member at such selected position. Thereafter, the knob remains freely movable and disconnected from the rotatable member until the rotatable member is returned to its zero position, and the knob is manually returned to its zero position. When the knob and the rotatable member are thus returned to their respective zero positions, they are automatically locked together again, to be in condition for another manual selection setting of the knob. According to this invention the rotatable member may be a timer, or the like, suitable for controlling one or more programs to be performed by a controlled device, such as a washing machine and the like.

The timer may have an impulse controlling rotatable member with program controlling bands, hills, valleys, irregularities, or the like, which control electrical impulses, or other energy impulses, which are sent to the device which is to be controlled.

The impulse controlling rotatable member may have a zero position, at which position the rotatable member is normally placed before any controlling action is produced by such rotatable member. This zero position also may be the position to which the rotatable member is returned after a controlled program has been completed, and at which zero position the rotatable member is to remain, until the timer is again manipulated by the operator to start the control of another program.

A manual controller, such as a knob or the like, may be associated with the rotatable member in a manner to permit the operator to rotate the knob and simultaneously thereby to rotate the rotatable member to a program start position, which may be the starting position of one or more programs.

The manual controller may have means which automatically lock the knob with the impulse controlling rotatable member when the knob and the impulse member are both at their respective zero positions and are ready to be moved by the operator to the selected starting point of a program. The knob and the rotatable member are placed at the selected start position of the program, and then a starting device is actuated, such as a push button or the like, so the rotatable impulse controlling member is started to be rotated by a timer motor, and the like. The first movement of the rotatable impulse member in performing or controlling the program, automatically disconnects the knob from the rotatable impulse member, so thereafter the knob may be turned indefinitely without altering the control of the program until such time as the rotatable impulse member is automatically returned to its zero position. When the knob also is returned to its zero position, such returning action automatically locks the knob and the rotatable impulse member together, to permit the operator again to select and start another program.

This is of great advantage, for example, where there are children who are likely to turn the knob while the washing machine is performing a program, and thereby are likely to spoil the washing operation, unless the advantages of this invention are used.

Other features of this invention are apparent from this description, the appended claimed subject matter, and/or the accompanying drawings in which:

FIGURE 1 is a vertical cross section of the timer construction, taken substantially along line 1—1 of FIGURE 9.

FIGURE 2 is a vertical cross section taken generally along the line 2—2 of FIGURE 1, with a certain member shown partially broken away.

FIGURE 3 is a cross section along the line 3—3 of FIGURE 2, with the broken away member of FIGURE 2 shown in cross section along a different plane from the plane of other parts.

FIGURE 4 is a top plan view of a portion of FIGURE 2, taken generally from the plane 4—4 of FIGURE 2.

FIGURE 5 is a view similar to a portion of FIGURE 3, but showing the broken away member of FIGURE 2 in cross section in the same plane as the other parts shown in FIGURE 5.

FIGURE 6 is a view similar to FIGURE 5, but showing the parts of FIGURE 5 after the rotatable impulse member has been initially moved at the start position of a selected program to unlock the knob from such rotatable member.

FIGURE 7 is a plan view of a small locking member, which locks the knob and the rotatable impulse member together.

FIGURE 7A is a plan view of a spring member which spring biases the member shown in FIGURE 7.

FIGURE 8 is a top plan view of a portion of FIGURE 2, but showing the broken away member of FIGURE 2 not broken away in FIGURE 8.

FIGURE 9 is a diagrammatic front view of the timer construction, from line 9—9 of FIGURE 1, and showing the manual controller or knob, which is to be turned by the operator from its zero position to any selected program start position.

FIGURE 12 is a view, in reduced scale, of one of the disc like members of the knob connecting means shown in FIGURES 1 to 8.

FIGURE 15 is a view similar to FIGURE 12, but showing another disc like member of the knob connection means.

FIGURE 16 is a view similar to FIGURES 12 and 15, and showing a third disc like member of the knob connecting means.

Figure 10:
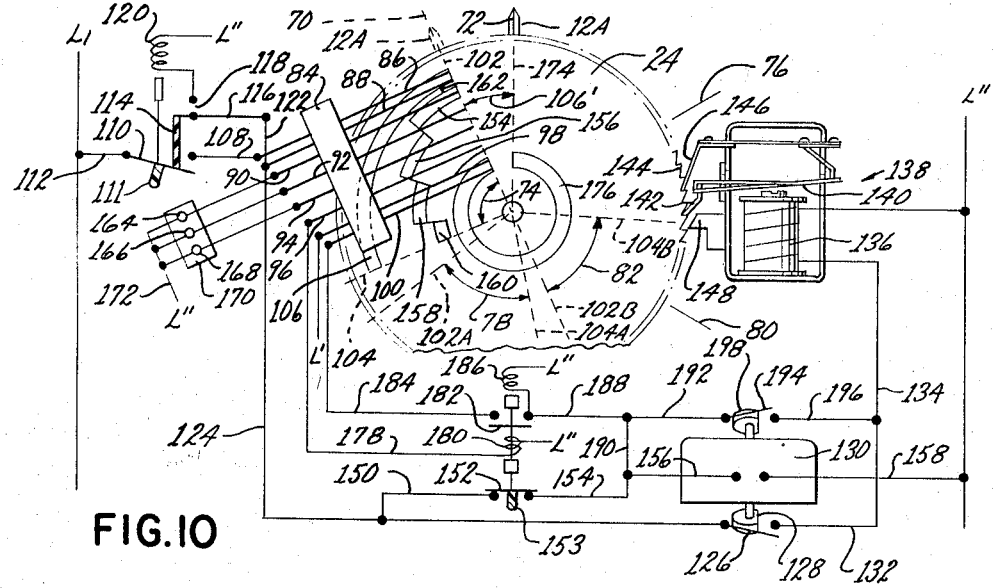
FIGURE 10 is a wiring diagram showing a diagrammatic construction of the rotatable impulse member, and how such construction may be interconnected to a controlled member, such as a washing machine, and to the knob, with the knob shown in full lines at one of its program start positions and with the impulse controlling member shown at one of its program start positions.

The rotatable member, such as a timer, may be provided with a manual controller, which may include a rotatable disc 10, and an attached knob 12, these parts being received in an opening 15 of a front panel 13. The knob 12 is manually movable from a first or zero position to a second or selected start position. The manual controller may also include a rotatable disc 14 which is connected with the disc 10 by means of pins 16. The disc 14 may have a shaft 18, which may be hollow, and may be integral with the disc 14 as shown in FIGURE 1.

An impulse controlling rotatable member or disc shaped card 24 may be attached to a hub 22, a hollow shaft 20, and a washer 26. The shaft 20 may be located inside the shaft 18.

A stationary shaft 28 may be supported at 29 by a stationary support 30 such as the back panel of a timer. The shaft 28 may be inside of and provide the support for shafts 18 and 20.

The rotatable impulse member 24 may be a suitable program controller, which is rotatable from a zero or first position to a second position, such as to one or more program start positions, after which it is automatically rotatable through the selected program. After the controlling action of the selected program has been performed by further rotation of member 24, it may be automatically returnable to its zero position. This action is elsewhere more fully described.

A rotatable disc 36 is fixedly rotatable with the member 24 through the medium of shaft 20, to which both members are attached in fixed relationship.

Means for automatically locking the knob 12 with the rotatable impulse member 24 at their respective zero positions, and for automatically disconnecting the same at the first pulse movement of the selected program may be provided, and is generally indicated at 37. Such means may include a spring actuated disc 38 which is freely mounted rotatably on stationary shaft 28 through the medium of hub 54, which may be integral with or fixedly secured to the disc 38. A helical spring 40 automatically rotates the disc 38 counter clockwise in FIGURE 2 and such disc is initially rotated clockwise and then released for counter clockwise rotation by spring 40, as elsewhere described. One end 56 of the spring 40 is secured, FIGURE 2, to the hub 54, and consequently also to the disc 38. The other end 58 of the spring 40 is connected to a stationary cup-like member 44, which is stationarily held by the stationary shaft 28 by the washer and screw construction 60. Another stationary disc 42 may be stationarily held by shaft 28 by washer 43. The disc 42 is for the purpose of maintaining the helical spring 40 in a wound condition around the hub 54, in a manner to prevent the spring from springing laterally outward and from becoming tangled.

The disc 36 may be provided with a plurality of dimples 46 to prevent undue frictional contact with the disc 38. The disc 38 may be maintained in its correct lateral position by the extension 47 of the shaft 28. The shaft 20 may be axially locked on the shaft 28, for example, by the enlargement 49 at one end of shaft 28, and by the extension 47 of shaft 20 in combination with hub 54, disc 42, spacer 43, member 44, and screw construction 60.

The automatic locking means between the knob 12 and the rotatable program member 24 may include a relatively stiff tongue 48 on the disc 36 which forms notch means to cooperate with a notch means engaging member in the form of a rockable locking plate 50 which has one end downwardly pressed, in FIGURE 3, by the spring construction 52. The locking plate 50 has its end 51 pressed into the notch means formed by the tongue 48 by the rocking movement imparted by the downward biased spring 52, as shown in FIGURE 3, when the knob 12 and the program member 24 are both in their respective zero positions.

The rotatable disc 14 has a slot 53, FIGURES 2 and 16, which receives the spring 52 and the rockable plate 50. The rockable plate 50 has fulcrums or tongues 50A which are received in lateral slots 50B in the member 14, in a manner to prevent the rockable member 50 from slipping longitudinally on the member 14. However the member 50 is freely rockable in slot 53, as will become apparent. The spring 52 has tongues 52A which are received in slots 52B of slot 53 in a tight manner, so as to maintain the spring 52 firmly locked at the tongues 52A in the slot 53. However, the spring end 52F is free to move up and down in spring action against the end 50F of the rockable member 50. The spring end 52F is downwardly biased in FIGURE 3.

The rotatable disc 38 may have a tongue 62 near its periphery, FIGURES 2 and 4, which will stop counter clockwise rotation of the disc 38 by the spring 40 when the tongue or flange 62 engages the stationary stop flange 64. The flange 64 may be secured to and supported by the stationary cup-like member 44, by screw bolts or the like 65'.

The rotatable disc 38 may also have a slot means or opening 66, FIGURES 5, 6, 8 and 12, which may extend along the rim 38A and also along the wall 38B of a central cup portion 38C. This opening 66 provides an abutment edge 68 which extends along the rim 38A and the wall 38B, so the front end 51 of the rockable member 50 may extend into the slot 66 and may abut the edge 68, FIGURES 2, 3, 5 and 8, when both the knob 12 and the program member 24 are in their respective zero positions as elsewhere more fully described. This relationship at their respective zero positions is shown in FIGURE 5, for example, with the end 51 of the rockable member 50 engaging the edge 68. When the operator starts to rotate the knob 12 clockwise in FIGURES 2 and 9, the member 14 which is fixed to the knob 12, is likewise rotated clockwise, in FIGURE 2. This causes the member 50 to be moved leftwardly in FIGURE 5 and to drive the disc 38 also leftwardly, and clockwise in FIGURE 2, and this motion will continue, until the operator stops rotation of the knob 12 with the knob pointer 12A at some selected program start position, such as 72, in FIGURE 9. He may alternatively rotate the knob pointer 12A to program start positions 76 or 80, as desired. The operator then stops rotation of the knob, and the relative position of the parts shown in FIGURE 5 will remain in that position, until the operator actuates a program start member, such as the button 111 of FIGURE 10, which will cause the program member 24 to be advanced by the timer motor 130 to start to produce the selected program 74. This advancing motion of the program member 24, carries with it the disc 36 to which the member 24 is fixedly secured. Therefore, the initial movement for the production of the selected program, causes the disc 36 in FIGURE 6 to advance leftwardly in FIGURE 6 to the dotted line position shown for the tongue 48 of disc 36. The leftward movement of the tongue 48 occurs while the member 50 remains stationary because it is carried by the now stationary knob part 14. The end 51 of the rockable member 50 is then pressed down under the rim 38A of the spring rotatable member 38, as shown in FIGURE 6. This downward movement of the front end 51 releases the spring disc member 38, to permit it to be rotated by spring 40 in a counter clockwise direction in FIGURE 2, or rightwardly in FIGURE 6. This disconnects all rotary drive connection between the knob 12 and the program member or card 24, so that the program member 24 may then be driven by the timer motor 130 through the selected program 74, and back to the card zero position of program member 24 at the completion of the production of the program.

However, during the entire production of the program 74, the knob 12 cannot be connected drivingly with the program member 24, since the connecting member 50 cannot enter the slot of the tongue 48 except when the program member 24 is in its zero position and knob 12 is also in its zero position, to produce the conditions of FIGURE 5, and these conditions can only be fulfilled after the program member 24 has returned to its zero position and the knob 12 has been turned by the operator to its zero position in readiness to select a program.

However, an emergency return of member 24 may be produced by pushing an emergency push button 153, FIGURE 10, which may be pushed up, in FIGURE 10, and this establishes a quick return circuit quickly to drive the program member 24 to its zero position, if the emergency should arise, or if a change of program is desired. Such push button 153 may be located where it would not be readily available for tampering by children, but readily available to the operator, if desired.

It is thus to be seen that the knob 12 and the program member 24 cannot be connected together unless both these members are in their respective zero positions.

When they are in their respective zero positions, they are interlocked, as shown in FIGURES 3 and 5, and clockwise rotation of the knob 12 by the operator will advance the knob 12 and the program member 24 to a selected program start position, such as 72, 76, 80, etc. and when so positioned the stop button 111 may then be actuated, upwardly in FIGURE 10, to start a program and to disconnect knob 12 from the member 24 until the program is completed.

Thereafter, the program member 24 is automatically returned to its zero position after the selected program has been performed as elsewhere described.

The operator may then turn the knob 12 to its zero position, and then the locking action shown in FIGURES 3 and 5 will take place, so that the operator may then actuate both the knob 12 and program member 24 to a newly selected program at any future time.

In order to insure that the knob 12 can only be turned in one direction, if desired, such as clockwise in FIGURE 2, the member 14, to which the knob 12 is secured, may be provided with ratchet teeth 65 which may be engaged by the stationary or resilient spring tongue 67, which may be mounted on a stationary support 67A, and this insures that only clockwise rotation of the knob 12 can be produced, with respect to FIGURE 2.

The member 24 may be automatically driven through a selected program, and may then be automatically returned to its zero position, by any suitable drive construction desired. For example, the arrangement shown in FIGURE 10 may be used, although any other arrangement may also be used if desired.

The disc 24, FIGURE 10, may be any type of program actuation or impulse controlling member or actuating construction which can be read by reading members, such as reading fingers 86–100, or reading switches, etc., to control one or a plurality of programs such as 74, 78 and 82, to be performed by a mechanism to be controlled.

The rotatable member or actuator 24, when locked to the manipulator 12, may be moved by the manipulator from their respective zero positions to any one of the manipulator program start positions 72, 76 and 80 to select any one of the selected programs 74, 78 or 82, etc. Thereafter, the selected program, such as 74, may be started in any desired manner, such as by actuating a push button 111. The starting movement of the controlling member 24 automatically unlocks the manipulator 12 from the controlling member 24, as in FIGURE 6 while the controlling member 24 continues to cause performance of the selected program at program speed, which may be a relatively slow speed.

Thereafter, the actuator or card 24 may be moved at return speed, which may be relatively fast speed, to the card zero position.

When the card or manipulator 24 has been returned to card zero position, the manipulator or knob 12 may be moved by the operator to knob zero position 70. This places both the card 24 and knob 12 in their respective zero positions, and they are then automatically locked, as in FIGURES 2 and 5, so the operator may select another program.

The knob pointer 12A may be moved from the knob zero position 70 to knob program start position 72, for program 74, or to knob position 76, for program 78, or to knob position 80 for program 82, etc.

A reading head or reading member 84 may be placed adjacent the card 24 and may have a plurality of reading members, such as reading wire fingers or reading switches. Herein these are illustrated as resilient reading wire like members or fingers 86, 88, 90, 92, 94, 96, 98 and 100 or more, which are held more or less stationarily adjacent one end by insulating reading head 84 and are biased resiliently at their other ends against card 24.

Depending upon the position of the reading head 84, and the contacting ends of the reading fingers, the program card 24 may have its starting position 102 of program 74 trailing the knob pointer 12A by the angle 106'. That is, when the knob pointer 12A is moved to program start position 72, then the card program start position 102 is where it contacts the fingers 86–100 and trails by the angle 106', so that the program start position on the card is at 102, rather than at 72. The card program 74 may extend along angle 74, FIGURE 10, from the card start position 102 to the card program termination position 104.

However, if desired, both the knob zero position and the card zero position may be in the same radial axial plane, as is obvious.

A program speed producing electrically conductive band 106 may extend from line 102 to line 104 on card 24 and may be read or contacted by the ends of the reading members or wires 86 and 88 so that these reading members 86 and 88 are continuously bridged electrically by the program feed band 106 during the time that the card 24 rotates to bring the program termination position line 104 under the reading ends of the reading fingers 86–100.

Means are provided for rotating the card 24 at program speed, or relatively slow stepping speed, while the card 24 rotates or traverses the program 74 from line 102 to line 104.

This is accomplished by causing the relay 138 to step drive the card 24 at slow intervals, such as once every two minutes.

To this end, the connector end of reader 86 may be connected to line 108, combined push button 111 and blade 110, line 112, and supply line L'. The push button 111 and blade 110 may have an insulating pusher 114, which pushes on the downwardly biased spring blade 116. Upward movement of blade 116 closes the holding contacts 118 to energize the holding coil 120, the other end of which may be connected to line L".

The energized holding coil 120 holds the blade 110 in its closed upper position as long as the program producing band 106 bridges the reading members 86 and 88, since holding current flows from line L', line 112, button blade 110, line 108, reader 86, band 106, reader 88, line 122, holding blade 116, holding contacts 118, holding coil 120 and supply line L". Accordingly, after the push button 111 and blade 110 has been pushed up by the operator (after having moved the knob 12A to program start position 72) the push button blade 110 will be held in closed position while the program card 24 is driven at program speed, until the card program terminal position 104 passes from under the contact ends of readers 86–100. When the card reaches this position, the band 106 passes beyond the end of the readers 86 and 88, and breaks the holding circuit of coil 120 and allows the start button 111 and blade 110 to move to open position to deenergize holding coil 120 and to deenergize the program stepping circuit which is now to be described.

While the card 24 is traversing the program angle 74, the program feed band 106 also energizes the program stepping means, which includes line 124, which is connected to means for rotating the card 24 at program speed, or relatively slow speed. For example, the line 124 may be connected to a relatively slow interval cam switch 126 which is opened and closed by the cam 128 which is driven at program speed, or relatively slow speed, by the timer motor 130. For example, the switch 126 may be closed once every two minutes for a relatively short time of contact, which energizes the lines 132, 134, stepping relay coil 136, which is connected to the electrical supply line L″. The supply lines L′, L″ may be the usual A.C. supply of approximately 110 volts or the like.

The stepping relay 138 may have a relay armature 140, which may have a leftwardly spring biased pushing finger 142, which engages the ratchet teeth 144 on the periphery of the card 24. A relative stationary leftwardly spring biased tooth 146 may also engage the ratchet teeth 144, to prevent counter clockwise movement of the card 24.

The spring tooth 142 may engage the slanting stationary abutment 148, which may be stationarily supported by any suitable means such as any part of the stepping relay. When the tooth 142 strikes the abutment 148, the tooth 142 is firmly pushed leftwardly and held against the adjacent ratchet tooth 144 of card 24 in firm stopping position, so that the combined action of these interlocked teeth 144 and 142 and abutment 148 causes a firm stopping action of card 24 at the end of each step of armature 140.

The cam 128 may be driven at the relatively slow speed previously described, by the motor 130 through suitable speed reduction transmission. The motor 130 may be energized from line 124, through the branch line 150, combined emergency push button and downwardly biased connecter blade 152, lines 154 and 156, to connect supply line L′ with the motor 130. The other side of the motor 130 is connected by line 158 with the supply line L″.

From the above it will be seen that the program card 24 is caused to move through the arc 74, FIGURE 10, of the first program, if that is the one selected, at a relatively slow stepping speed or program speed by reason of the energization of the motor 130 and slow speed cam switch 126, which intermittently energizes the relay 138 at relatively slow or infrequent intervals.

A plurality of program producing bands, for example such as electrically conducting bands 154, 156 and 158 may be provided, which may be electrically interconnected with the band 106, so that all of these bands, and also the program terminating band 160 are all energized from the band 106, as long as the reader 86 contacts band 106 and is energized from the supply line L′. The electrical interconnections are indicated such as at 162.

The bands 154, 156 and 158, are merely exemplary and indicate any number and arrangement of bands desired, to produce the desired program.

The reader members 90, 92 and 94, more or less, may be connected to the washing machine control members 164, 166, 168, more or less, of a controlled mechanism such as an automatic washing machine 170. The other sides of these control members 164, 166, and 168, may be connected by the line 172 with the power supply line L″. It is thus to be seen that the washing machine 170 or similar program controlled mechanism, may be properly controlled to have it produce the selected program 74 while the card 24 is traversing the angle or program 74.

Return means may be provided to move or rotate and return the card 24 to a card zero position, with the card zero position 174 substantially at the position illustrated at 102 in FIGURE 10. To this end, a card return electrically conducting band 176 may extend substantially from the position 102 circumferentially around, to substantially card zero position 174, as illustrated in FIGURE 10. This band 176 is contacted by the ends of reader members 98 and 100 to produce a circuit which produces a fast return motion of the card 24 immediately after the program terminating band 160 has contacted program termination reader member 96.

When the program termination band 160 contacts reader member 96, it energizes the line 178 from the electrically interconnected circuit with the other program bands 106, 162, 154, 156, 158 and 160. Energization of line 178 energizes relay coil 180 to open push button blade 152 and simultaneously to close holding blade 182. Relay coil 180 is connected to L″ also. Closing of blade 182 permits current to flow from power line L′, reader 98, return band 176, reader 100, line 184, blade 182, holding coil 186, and line L″. Also, blade 182 energizes the fast stepping return circuit which includes line 188, and lines 190 and 192. Energization of line 190, along with line 156, energizes the motor 130, which an instant before had been deenergized by the opening of blade 152. The change is so fast that the motor 130 continues to run, since the break in the line is so short that the motor does not reduce its speed. Energization of the frequently opening and closing time switch 194 energizes the lines 196 and 134 at relatively fast or frequent return intervals, such as once every ten seconds, correspondingly to energize the relay coil 136 at said relatively frequent intervals, so that the relay 138 fast step drives the program card 24 substantially back to the zero position. The return movement of card 24 stops when the card zero line 174 has just passed from under the reading ends of the readers 98 and 100. The breaking of the electrical bridge between the ends of the readers 98 and 100 when the band 176 moves out from under such ends, breaks the energization of the holding coil 186, so that the blades 152 and 182 move to their lower position from their previous upper positions, and the return circuit is opened throughout along with all other electrical circuits controlled by the timer bands.

The cam 198 of the cam switch 194 may be driven by the motor 130 at return relatively high speed, by a suitable transmission, to produce the desired return speed, as is obvious.

The programs arcs 78 and 82 on card 24 may be provided with bands substantially corresponding to those shown with respect to program arc 74. However, such bands in the programs 78 and 82 may be changed as to length, number and arrangement of the bands, the components which the bands are to energize with the member 170, and to provide any other variation in the programs 78 and 82 which are usual, and which are desired to be produced by such programs 78 and 82 or any other additional programs. The program 78 may have a start position 102A, and a termination position 104A, and the program 82 may have a start position 102B, and a termination position 104B, which corresponds in function and effect to the start position line 102 and termination line 104, previously described. Any additional programs may have similar start and stop positions.

If it is desired to select program 78 instead of program 74, the knob 12 may be moved so pointer 103 is at position 76, and then the start push button 111 may be pushed up. Alternatively, if program 82 is to be selected, then the knob 12 may be moved so the pointer 103 is moved to line 80, and these movements respectively place the start lines 102A and 102B at the same position as is illustrated with respect to line 102, in FIGURE 10, so the reading members 86, 88 etc. are in readiness to read the particular program selected. At the end of any selected program, when the termination line 104A, or 104B, etc. reaches the reading line, then the fast return circuit is energized as previously described with respect to the line 104 until the card is returned to card zero position.

Wherever deemed desirable, the front and rear ends of the reader engaging, electrically conducting bands 106, etc., on the card 24 are co-related with the ends of the reading fingers 86, 88 etc. and with stepping action of the relay 138 so the ends of the reading members engage and disengage the conducting bands 106, 154, 156 etc. at a time when the tooth 142 is stepping the card 24 at a relatively high speed, so that there is a quick make or break at the front and rear ends of each of the bands to reduce arcing.

While the card 24 has been disclosed as a disc with electrical conducting bands on one of its surfaces, other forms of program controlling rotary members may be used, such as a card with bands on both sides of the card, a cylinder with bands for reading members, or with hills to actuate switches, which switches in turn control the program members of the machine. Other irregularities may alternatively be provided to energize readers, as desired.

Figure 13:
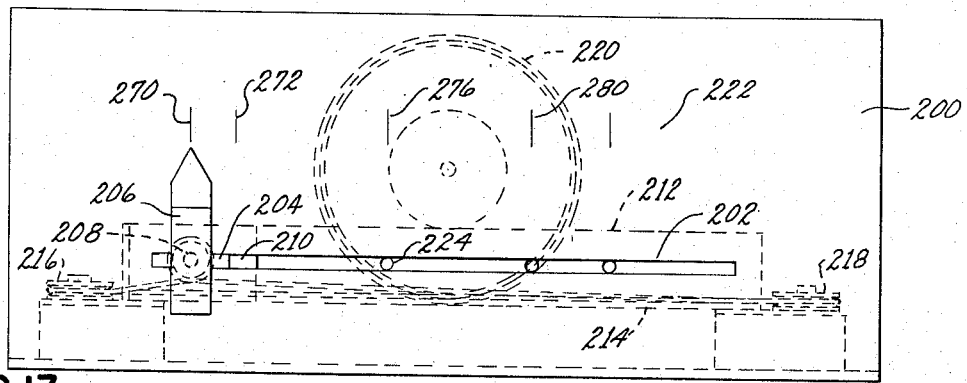
FIGURE 13 is a front elevation of another embodiment of this invention.
Figure 14:
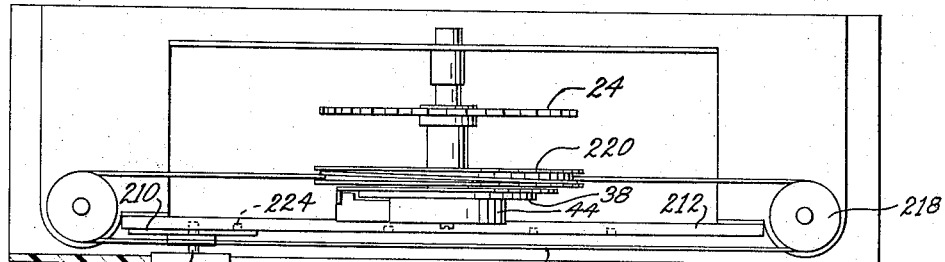
FIGURE 14 is a top plan view of FIGURE 13.
Figure 11:
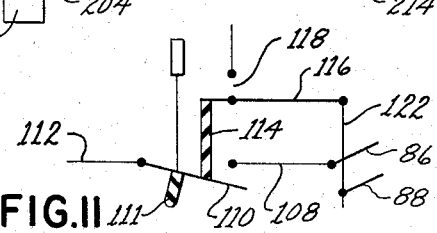
FIGURE 11 is an enlargement of a portion of FIGURE 10.

FIGURES 13 and 14 show a slide rule type actuation for the program card 24 instead of the knob 12 which has been disclosed in connection with FIGURE 1.

A front panel 200 may be placed, for example, at the same plane as the panel 13 of FIGURE 1. The front panel 200 may have a slot 202 extending therethrough in which a slide member 204 is located. A pointer and knob 206 may be secured to the slide 204, so that the slide 204 may be moved rightwardly and leftwardly along the slot 202.

The slide 204 may be connected by a pin 208 with another slide 210 which is supported and slidable on a stationary track 212. A belt, wire, or string construction 214 may pass around the pulleys 216 and 218 and may be secured by any suitable means to the slide 210, such as through the medium of pin 208. The belt construction 214 may be rotatably wound around the pulley member 220, which member 220 may correspond in function and in action with the rotatable member 14 of the previous embodiment of FIGURES 1, etc.

The other members of this construction of FIGURES 13 and 14 may be substantially the same as previously described in connection with FIGURES 1, etc. and some of the members are indicated by similar numerals merely for the purpose of identification and without placing reference numerals on all of them. For example, members 24, 38, 44, have been identified, and the remainder of the structure of FIGURES 1, etc. can thus be identified to be substantially the same as in the previously described embodiment.

The pointer 206 may point to a scale 222 which may have indicator lines 270, 272, 276, 280, etc. which may correspond to the pointer positions 70, 72, 76, 80, etc. of FIGURE 9.

If desired, the track member 212 may be provided with openings 224. The pin 208 may, if desired, be fixedly secured to the knob 206, and may be spring biased toward the stationary track 212. The pin 208 may extend into a selected opening 224 in track 212 under normal spring pressure. However, the knob 206 may be pulled outwardly from the opening 224 and then the slides 204 and 210 may be moved back and forth along the slot 202 and track 212 to any other selected opening 224, which openings correspond to the knob positions, etc. so the knob 206 may be locked at any desired program start position as it is being moved back and forth along slot 202.

The knob 206 thus may snap into any desired opening desired and this snapping movement may, if desired, start the desired program.

It is thus to be seen that a manual controller has been provided which may be used to set a movable or rotatable member from a zero position to a selected position and which automatically unlocks from such rotatable member after such setting operation has been completed. The manual controller and movable member may then automatically lock with each other when they are returned to their respective zero positions.

While the form of the invention now preferred has been disclosed as required by statute, other forms may be used, all coming within the scope of the claimed subject matter which follows.

What is claimed is:

1. In combination: a manipulator movable from a manipulator zero position to a program starting position; a program impulse controller having program initiating means to cause a program performance by a mechanism to be controlled, said impulse controller having a zero position, a program start position and a program termination position; drive means for said controller to cause said controller to actuate a program from a program start position to a program termination position and to cause said controller to move from said termination position to said controller start position; and locking and unlocking means between said manipulator and said controller to lock said manipulator and said controller together when they are simultaneously at their respective zero positions and to unlock them when they are moved by said operator to their respective program start positions.

2. A combination according to claim 1 in which said locking and unlocking means has means to cause said manipulator and controller to be unlocked at their respective start positions when a relative movement is produced between said manipulator and controller.

3. A combination according to claim 2 in which said locking and unlocking means has means to cause said relative movement to be produced by a progrm starting movement of said controller.

4. A combination according to claim 1 in which said manipulator and controller are unlocked at their respective start positions when a relative movement is produced between said manipulator and controller, and in which said relative movement is produced by a program starting movement of said controller and in which said locking and unlocking means includes a first disc fixedly rotatable by said manipulator and a second disc fixedly rotatable with said controller; notch means in one of said discs; a notch means engaging member in the other of said discs which engages said notch means when said manipulator and controller are in their respective zero positions and which disengages said notch means when said relative movement is produced.

5. A combination according to claim 4 in which a spring biased third disc has a slot means which is automatically aligned with said notch means and said notch means engaging members when said manipulator and controller are in their respective zero positions to cause locking engagement, and is spring biased out of alignment and released when said relative movement is produced to prevent said locking engagement except when said manipulator and controller are returned to their respective zero positions.

6. A combination according to claim 1 in which said drive means drives said controller at a relatively slow speed while said controller actuates said program and at a relatively high speed when said controller moves from said termination position to said controller zero position.

7. In combination: a manipulator movable by an operator from a manipulator zero position to a program starting position; a program impulse controller having program initiating means to cause a program performance by a mechanism to be controlled, said impulse controller having a controller zero position, a program start position and a program termination position; drive means for said controller to cause said controller to actuate a program at program speed from a program start position to a program termination position and to cause said controller to move at return speed from said termination position to said controller start position; and locking and unlocking means between said manipulator and said controller to lock together said manipulator and controller when they are simultaneously at their respective zero positions and to unlock them when they are moved by said operator to their respective program start positions and when said actuator is started to actuate said program.

8. A combination according to claim 7 in which said manipulator is movable from a manipulator zero position to a program starting position selected from a plurality of program starting positions, and said controller having a controller zero position and a program start position to be selected from a plurality of program start positions by selective manipulation of said manipulator.

9. In combination: a manipulator movable from a first manipulator position to a second manipulator position; a manipulator adjustable member having an adjustable member first position and an adjustable member second position; drive means automatically to return said adjustable member from said member second position to said member first position; and locking and unlocking means between said manipulator and adjustable member to lock together said manipulator and adjustable member when they are simultaneously at their respective first positions and to unlock them when they are moved by said operator to their respective second positions.

10. A combination according to claim 9 in which said locking and unlocking means has means to cause said manipulator and adjustable member to be unlocked at their respective second positions, when a relative movement is produced between said manipulator and adjustable member.

11. A combination according to claim 10 in which said locking and unlocking means has means to cause said relative movement to be produced by starting movement of said adjustable member.

12. A combination according to claim 9 in which said locking and unlocking means automatically lock said manipulator and adjustable member again when they are independently returned to their respective first positions.

13. A combination according to claim 12 in which said locking and unlocking means includes a first disc fixedly rotatable by said manipulator and a second disc fixedly rotatable with said adjustable member; notch means in one of said discs; a notch means engaging member in the other of said discs which engages said notch means when said manipulator and said adjustable member are in their respective zero positions and which disengages said notch means when said relative movement is produced.

14. A combination according to claim 13 in which a spring biased third disc has slot means which is automatically aligned with said notch means and said notch means engaging members when said manipulator and adjustable member are in their respective zero positions to cause locking engagement, and is spring biased out of alignment and released when said relative movement is produced to prevent said locking engagement except when said manipulator and adjustable member are returned to their respective zero positions.

References Cited by the Examiner
UNITED STATES PATENTS

| | | |
|---|---|---|
| 1,634,083 | 6/1927 | Rutenber. |
| 2,889,419 | 6/1959 | Miller et al. |
| 3,003,097 | 10/1961 | Jennings _____ 307—141.4 X |
| 3,101,418 | 8/1963 | Gould _____ 307—141 |
| 3,171,045 | 2/1965 | Jacobs _____ 307—141 |

ORIS L. RADER, *Primary Examiner.*

LLOYD McCOLLUM, *Examiner.*

W. M. SHOOP, T. B. JOIKE, *Assistant Examiners.*